April 11, 1933.  M. D. CAMPBELL  1,903,502
OPTICAL PERIMETER
Filed June 23, 1930   2 Sheets-Sheet 1
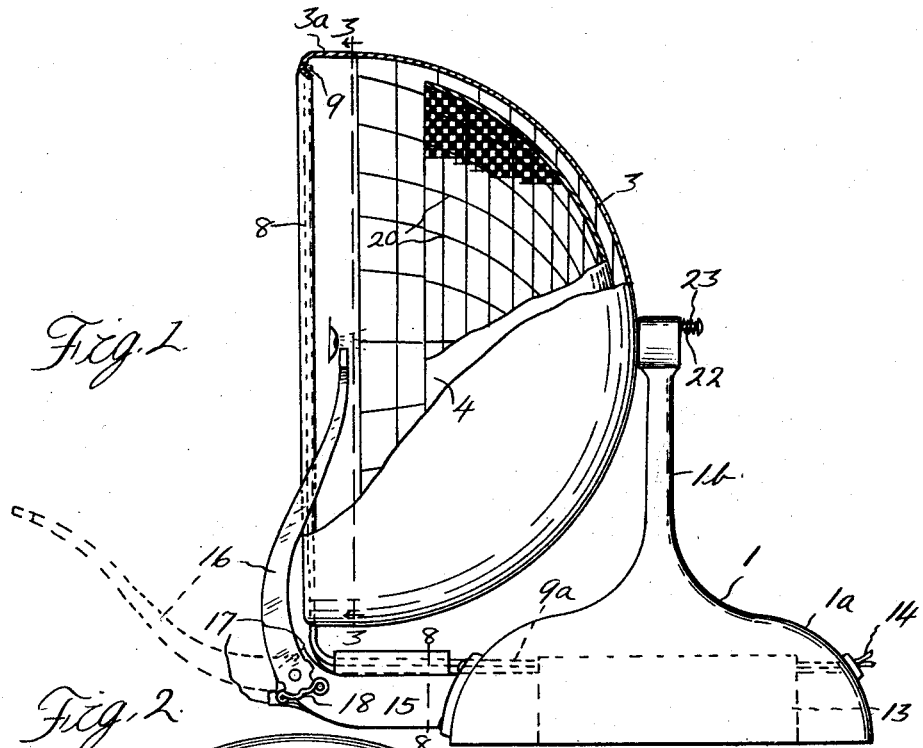
Fig. 1
Fig. 2
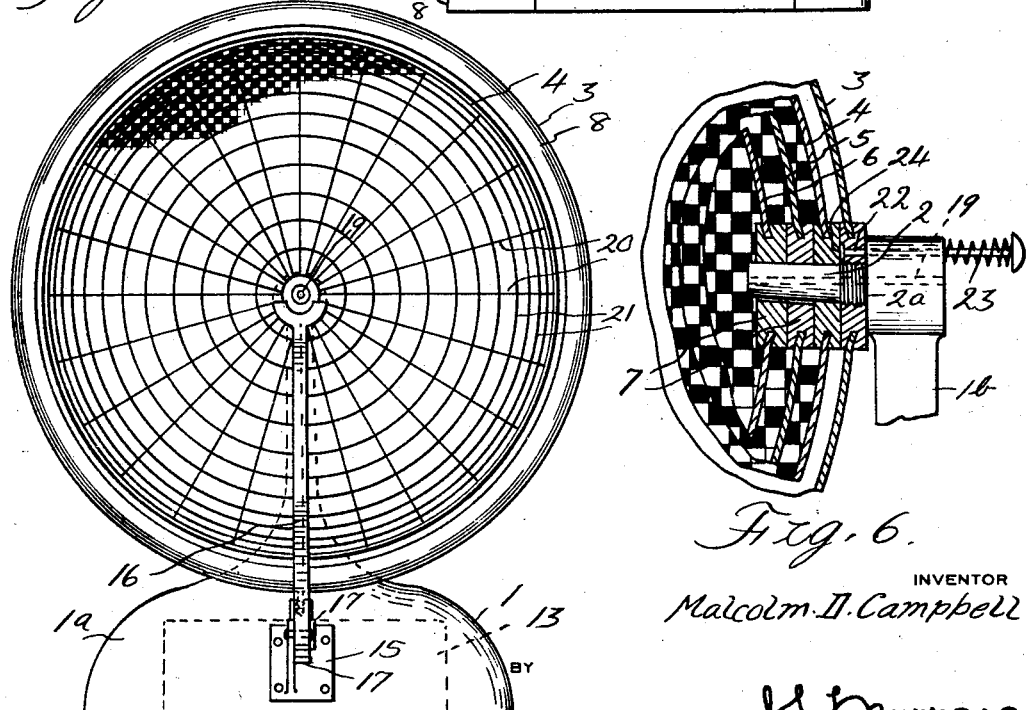
Fig. 6
INVENTOR
Malcolm D. Campbell
ATTORNEY

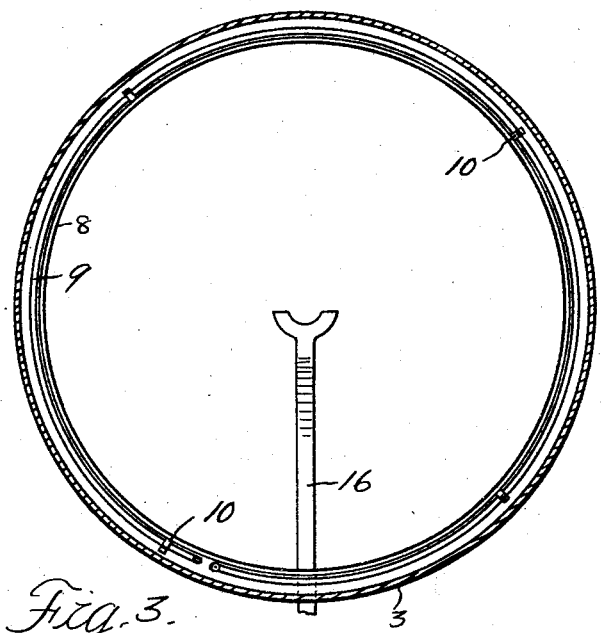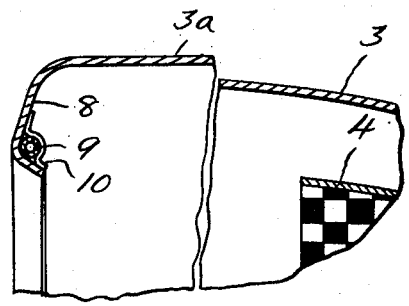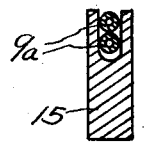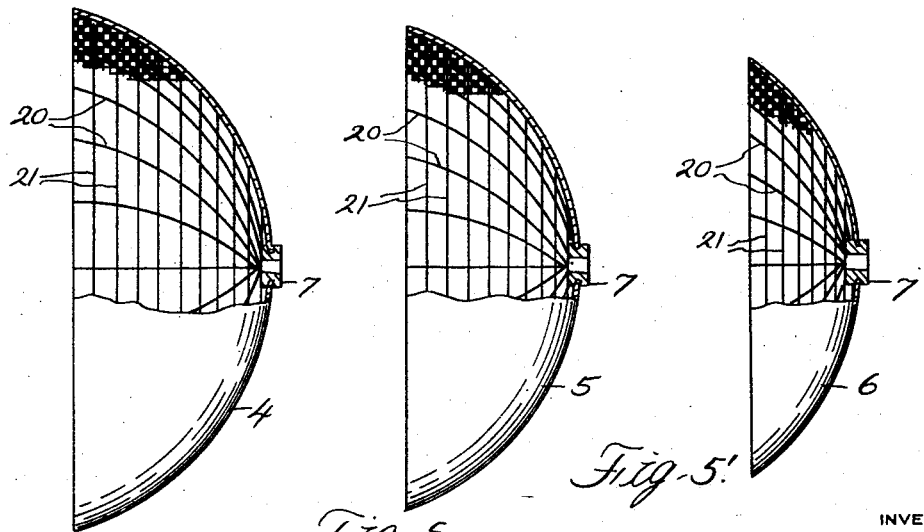

Patented Apr. 11, 1933

1,903,502

UNITED STATES PATENT OFFICE

MALCOLM D. CAMPBELL, OF DETROIT, MICHIGAN

OPTICAL PERIMETER

Application filed June 23, 1930. Serial No. 462,953.

This invention relates to optical instruments and more particularly to perimeters.

An object is to adapt a perimeter to effect an instant test of the entire retina, rather than a progressive test of different portions by a moving point, as in present practice.

Another object is to adapt a perimeter to test discriminative powers of the retina with respect to certain colors.

A further object is to provide a method and instrument for testing discriminative powers of the retina and locating any defective portions thereof, utilizing negative after images as checks on tests employing positive present images.

Still another object is to equip a perimeter with test shells of substantially hemispherical form, having their interior faces substantially covered with suitable test patterns, and to provide special and efficient means for illuminating such surfaces.

A still further object is to adapt a plurality of such test shells to be mounted selectively upon a common support in a definite position of use, or to be together placed on said support in a nested relation.

It is also an object of the invention to adapt an arm determining an eye fixation point to be swung from its normal position of use at the front of the perimeter so as to permit ready removal and replacement of the aforementioned shells.

These and various other objects the invention attains by the construction hereinafter described, and illustrated in the accompanying drawings, wherein:

Fig. 1 is a view in side elevation of the improved perimeter, sectionally showing two of its testing shells in use position.

Fig. 2 is a front view of the same.

Fig. 3 is a vertical sectional view, taken up the line 3—3 of Fig. 1, and primarily illustrating a provision for illuminating the interior faces of the shells.

Figs. 4, 5 and 5' are axial, sectional views of three other shells, which may selectively replace the smaller shell of Fig. 1.

Fig. 6 is an enlarged, vertical section of the upper end of the shell-carrying post, showing how the several shells may be nested within each other upon a pin carried by said post.

Fig. 7 is a fragmentary enlargement of a portion of Fig. 1, particularly showing a light source and associate reflector.

Fig. 8 is a vertical section, taken on the line 8—8 of Fig. 1 and showing means for protecting a luminous gas tube as it leads from the transformer.

In these views, the reference character 1 designates a stand comprising a hollow base 1a and a post 1b rising from said base and preferably integral with the latter. Rigidly carried by the upper end of said post and forwardly projecting therefrom is a pin 2, preferably metallic, and having a screw threaded portion 2a closely adjacent to the post and of somewhat greater diameter than the main body of the pin, the latter being gradually tapered from said portion to its free end. Said pin is adapted to carry a plurality of spherically curved dished shells 3, 4, 5 and 6, preferably spun from sheet metal and differing slightly in radius, whereby they may be nested one within another, as appears in Fig. 6. Each of said shells centrally carries a hub or button 7 centrally apertured to slide upon the pin 2 and tapered correspondingly to the latter, said hub of the shell 3 being screw threaded to engage the threaded portion 2a of the said pin. The shell 3 is substantially hemispherical and is interiorly of a neutral gray color, and has a cylindrical extension 3a, sleeved upon its rim portion and marginally spun inwardly, or toward the center of curvature of the shell, to form an annular reflector 8, the inner surface whereof is highly polished.

Secured to the extension 3a in coacting relation with the reflector 8 is a source of light, preferably having the nature of a tubular annulus 9 containing neon or some other gas adapted to be rendered luminous by an electric current. Said tube may be attached to the shell at suitable space intervals by brackets or clips 10. The annulus 9 has a tubular connection 9a to a transformer 13 housed within said base, from which extend conductors 14 for connection to some suitable source of electrical energy.

The shells 4 and 5 extend preferably through arcs approximating one hundred forty degrees, and interiorly carry patterns forming numerous small alternating areas of contrasting colors. The patterns illustrated are productive of a checkered effect, the shells 4 and 5 respectively using black and white and red and white as the alternating colors.

The shell 6 has an arcuate extent of approximately one hundred degrees, and is interiorly patterned similarly to the shells 4 and 5, using however, green and white as the alternating colors.

Rigidly forwardly projecting from the base 1a is a bracket member 15 on which is pivoted an eye-locating arm 16 adjustable from the upright position of use shown in full lines in Fig. 1 to the dash line position shown in said figure. In the latter position, said arm is clear of the path of travel of the several shells as the latter are shifted into or out of engagement with the pin 2. The bracket member 15 preferably is formed with stops 17 engageable by the arm 16 in its raised and lowered positions, and a small leaf spring 18 upon said bracket serves to yieldably maintain either limiting position of said arm.

Preferably, the pin 2 is formed with a sight passage 19 extending from and to the end thereof, through which an oculist may observe the eye of the patient.

In use, the patient is seated in front of the described intrument with his eye at substantially the focal point of the several shells as established by the upper end of the arm 16.

The shell 3 is permitted to remain permanently in threaded engagement with the pin 2, and initially the shell 4 is additionally mounted on said pin closely adjacent to the shell 3. The patient is then requested to fix his eye upon the central point or hub of the shell 4, and in so doing to inform the oculist as to any portions of the checkered surface of said shell not clearly perceived. This serves to test the discriminative powers of the retina and to ascertain the existence of any portions of the retina that are not properly functioning. Such portions are indicated by apparent blanks on the checkered face of the shell, which the patient can point out to the oculist. For the purpose of recording the results of the test, the interior face of the shell is marked (in any suitable manner) with two series of relatively transverse circles 20 and 21 spaced apart a suitable number of degrees, as for example ten. Having completed this test as to the impression upon the retina of an actual image, the oculist removes the shell 3 and the patient's eye at the proper fixation point is directed to the central point or hub 7 of the shell 3.

There will now apparently appear on the gray interior surface of said shell the negative after image of the checkered face of the shell 4, and the degree of completeness of this after image establishes a reliable check upon the results obtained through use of the shell 4.

Continuing the test, the oculist now places the shell 5 in position of use and tests the patient's eye as to its ability to perceive a complete image of the checkered face of said shell. This shell is then removed as before, and a confirming test made as regards the negative after image.

Finally, the shell 6 is mounted on the pin 2 and its checkered face employed as already described to test the eye first as to the direct image, and, upon removal of said shell, as to the resultant after image.

To facilitate removal of the shells 4, 5 and 6 from the pin 2 there may be slidably mounted in the post 1 parallel to said pin a plunger rod 22, normally rearwardly projecting from said post through the action of a spring 23 compressed between the post and a finger piece carried by the rear end of said plunger. Said plunger passes through a suitable small opening in the hub of the shell 3, and its forward end carries a small enlargement 24, limiting response of the plunger to said spring. Thus the shells 4, 5 and 6 or any of them which may be carried by the pin 2 may be forwardly actuated for removal from said pin by exerting a slight forward thrust on the plunger 22. It is to be noted that said plunger exercises an additional function in locking the shell 3 against unthreading from the pin 2.

The successive use of the shells 4, 5 and 6 accurately tests the discriminative powers of the patient's retina with respect to the colors forming the pattern upon said shells. That is to say, the actual pattern on the shell 3 comprises alternating black and white spaces, and the resulting after image will consist of light spaces on a gray background.

The actual pattern of the shell 4 comprises alternating red and white spaces, and the resulting after image will comprise green and gray alternating spaces. The pattern of the shell 6 comprises green and white spaces, and will produce a negative after image comprising red and gray spaces. While this will bring out quite fully the discriminative powers of the retina as regards color, it is to be understood that additional testing shells may be employed, marked with patterns in color schemes other than those specified. The light source formed by the neon tube 9 will brilliantly and uniformly illuminate the patterned faces of each shell as positioned for use, and at any time during the described tests the oculist may examine the patient's eye through the sight passage formed in the pin 2.

It is to be understood that the patient's eye will be allowed to dwell upon the patterns carried by the shells 4, 5 and 6 a sufficient length of time to produce that fatigue of the image-receiving portion of the retina, essential to production of a clearly discernible negative after image. The described perimeter accomplishes a valuable saving of time as compared to present types of such instruments, in that an instantaneous test is had on the complete retina, eliminating the slow and laborious procedure of shifting a sight object to various points in a hemispherical field of vision.

The described instrument is further superior to present type perimeters in testing the color-discriminative powers of the retina, and in providing for an accurate check on the recorded results by means of the negative after image. Such a check is peculiarly reliable since the after image, as perceived by the patient, is purely a retinal or mental phenomenon, and not subject to the possible inaccuracy of an image of external origin.

It is to be noted that the described perimeter may be also used if desired somewhat analogously to perimeters now commonly used. That is to say, in place of using the shells 3, 4 and 5 in the described manner, the oculist may manually shift a small target (not shown) to progressively establish it in points substantially covering the entire field established by the gray interior face of the shell 3, thus testing progressively all portions of the retina. Such a method is considered slower and less satisfactory than that already described, but is superior and more rapid than the methods made available by perimeters now in common use.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A spherically curved, dished shell for perimetric use, having upon its interior face a pattern comprising a plurality of small spaces alternately differing in color.

2. A perimetric shell as set forth in claim 1, its interior face being further marked with a series of parallel circles uniformly spaced and centered in the axis of said shell, and further marked with a series of arcuate lines intersecting at the shell center and uniformly divergent to one another.

3. A perimeter comprising a support, a plurality of spherically curved, dished test shells, selectively engageable with said support in substantially the same relation thereto, and means for locating an eye to be tested in proper relation to any of said shells.

4. A perimeter comprising a support, a plurality of spherically curved, dished test shells selectively engageable with said support in substantially the same relation thereto, and an eye-locating arm carried by said support and movable to facilitate removal and replacement of said shells on said support.

5. A perimeter comprising a support, a plurality of spherically curved, dished test shells provided with differential test patterns on their interior faces, means for mounting said shells selectively on said support, providing for their removal and replacement by an axial travel of the shells, and an arm pivoted upon said support and projecting upwardly for use in front of said shells and downwardly actuable to afford clearance for removal and replacement of the shells.

6. A perimeter comprising a support, and a plurality of spherically curved, dished shells interiorly provided with differential test patterns and selectively engageable with said support in substantially the same relation thereto, and proportioned to nest one within another.

7. A perimeter as set forth in claim 6, each of said shells centrally carrying an apertured hub, and said support being provided with a projecting pin with which said hub members are slidably engageable.

8. In a perimeter as set forth in claim 6, ejector means carried by said support for dislodging said shells from said support.

9. A perimeter comprising a stand having a pin projecting from its upper end, a plurality of dished test shells centrally apertured for selective engagement with said pin, a plunger slidable in said stand parallel to said pin for dislodging said shells from the pin, a spring normally retracting said plunger, and means carried by said stand for locating an eye in proper test relation to said shells.

10. A perimeter comprising a support, a pin projecting from said support and having a threaded portion adjacent the support, a plurality of dished test shells centrally apertured to engage said pin, the aperture of one of said shells being threaded to engage said threads of the pin, certain of said shells being differentially interiorly marked with a testing pattern, and means carried by said support for locating an eye in proper test relation to any of said shells.

11. The combination with a dished shell for perimetric use, having a symmetrical spherical curvature, a support for said shell, and means carried by said support for locating an eye to be tested substantially at the focus of said shell, of means carried by the outer portion of said shell for uniformly interiorly illuminating the shell 12. The combination with a dished shell for perimetric use, having a symmetrical spherical curvature, a support for said shell, and means carried by said support for locating an eye to be tested substantially at the focus of said shell, of a substantially annular tubular container for an electrically luminous gas carried by the outer portion of said shell for interiorly illuminating the shell.

13. In the combination set forth in claim 12, an annular reflector marginally carried by said shell and coacting with said tube.

14. A perimeter comprising a support, a plurality of spherically curved, dished shells selectively engageable with said support in substantially the same relation thereto, and interiorly provided with differential test patterns, said shells being proportioned to nest one within another, and means marginally carried by the outermost shell adapted to interiorly illuminate any of said shells when positioned for use.

15. A method of testing vision consisting in exposing the eye to be tested to a pattern occupying a spherically curved field and comprising contrasting colors, and subsequently subjecting the eye to be tested to a spherically curved field of a uniform color favorable to an impression upon the retina of a negative after image of the initially impressed pattern.

16. A method of testing vision consisting in impressing upon the retina the image of a pattern carried by a spherically curved field, and consisting of small spaces marked in alternately contrasted colors, and in exposing the eye to a spherically curved field of a uniform color favorable to the appearance of a negative after image.

17. A method of testing vision consisting in establishing an eye fixation point exposing an eye at said point successively to a test pattern and to the negative after image of said pattern, and relatively checking the results of said tests.

18. A method of testing vision consisting in locating the eye at a definite fixation point and successively establishing differential spherically curved test patterns in substantially the same focal relation to said fixation point.

19. A perimeter comprising a support, a dished shell upon said support having its interior face of substantially uniform color, a second dished shell removably engageable with said support and proportioned to fit within the first mentioned shell and having upon its interior face a pattern employing contrasting colors, and means carried by said support establishing an eye fixation point for said shells.

20. In a perimeter, a dished shell having a test pattern upon its interior face, an inwardly projecting opaque annulus carried by said shell at its margin, and means within said shell adjacent to said annulus for illuminating said test pattern.

21. The combination with a dished perimetric shell having a symmetrical spherical curvature and having a test pattern upon its interior face, of a light source for illuminating said pattern, interiorly carried by said shell.

22. The combination with a uniformly spherically dished perimetric shell, a support for said shell and means carried by said support for locating an eye to be tested substantially at the focus of said shell, of means for interiorly illuminating said shell forming an annulus positioned on the shell with its axis substantially coincident with that of the shell.

In testimony whereof I sign this specification.

MALCOLM D. CAMPBELL.